US009288037B2

(12) United States Patent
Obradovic et al.

(10) Patent No.: US 9,288,037 B2
(45) Date of Patent: *Mar. 15, 2016

(54) METHOD FOR TIME SYNCHRONIZATION IN A COMMUNICATIONS NETWORK

(75) Inventors: Dragan Obradovic, Ottobrunn (DE); Ruxandra Scheiterer, Geretsried (DE); Philipp Wolfrum, Munich (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

This patent is subject to a terminal disclaimer.

(21) Appl. No.: 13/825,532

(22) PCT Filed: Sep. 1, 2011

(86) PCT No.: PCT/EP2011/065126

§ 371 (c)(1),
(2), (4) Date: Mar. 21, 2013

(87) PCT Pub. No.: WO2012/038234

PCT Pub. Date: Mar. 29, 2012

(65) Prior Publication Data

US 2013/0182806 A1    Jul. 18, 2013

(30) Foreign Application Priority Data

Sep. 24, 2010   (EP) .................................... 10179498

(51) Int. Cl.
*H04L 7/04* (2006.01)
*H04J 3/06* (2006.01)

(52) U.S. Cl.
CPC ................. *H04L 7/04* (2013.01); *H04J 3/0673* (2013.01); *H04J 3/0667* (2013.01)

(58) Field of Classification Search
CPC ..... H04J 3/0667; H04L 7/0012; H04L 7/0016

USPC ................... 370/508, 503, 389, 342; 375/356
See application file for complete search history.

(56) References Cited

U.S. PATENT DOCUMENTS 6,671,291 B1 * 12/2003 Soliman ........................ 370/503
6,707,828 B1    3/2004 Wolf
(Continued)

FOREIGN PATENT DOCUMENTS

DE      102010022525 A1    5/2012
EP         1021009 B1       7/2000
(Continued)

OTHER PUBLICATIONS

International Journal of Principles and Applications of Information Science and Technology, Jul. 2008, vol. 2, No. 1 by Sunghwan Kang et al.*

(Continued)

*Primary Examiner* — Jianye Wu
(74) *Attorney, Agent, or Firm* — Cozen O'Connor

(57) ABSTRACT

A method for time synchronization in a communications network having multiple nodes, wherein the nodes comprise a first node and at least one second node, where the first node generates first cycle counter states according to a reference clock frequency and the second node or nodes each generate second cycle counter states according to an internal clock frequency, where a time synchronization is carried out in sequential synchronization cycles, in which synchronization messages originating from the first node are sequentially transmitted from one node to another node, and a synchronization message transmitted by a node contains information used for time synchronization in the at least one second node receiving the synchronization message such that a time synchronization is performed in a given second node based on an estimation of a first cycle counter state and a compensation factor in combination with a linear quadratic regulator.

19 Claims, 4 Drawing Sheets

(56) References Cited

U.S. PATENT DOCUMENTS

| | | | |
|---|---|---|---|
| 7,130,368 B1* | 10/2006 | Aweya et al. | 375/376 |
| 7,848,360 B2 | 12/2010 | Götz et al. | |
| 2002/0141452 A1* | 10/2002 | Mauritz et al. | 370/503 |
| 2004/0223480 A1* | 11/2004 | Nguyen et al. | 370/342 |
| 2006/0140135 A1* | 6/2006 | Bonta et al. | 370/254 |
| 2006/0153182 A1* | 7/2006 | Lockridge et al. | 370/389 |
| 2008/0095131 A1* | 4/2008 | Aljadeff et al. | 370/342 |
| 2008/0152046 A1* | 6/2008 | Armstrong et al. | 375/343 |
| 2009/0016475 A1* | 1/2009 | Rischar et al. | 375/356 |
| 2009/0086764 A1* | 4/2009 | Lee et al. | 370/503 |
| 2010/0073228 A1* | 3/2010 | Smith | 342/357.09 |
| 2012/0320902 A1 | 12/2012 | Na et al. | |

FOREIGN PATENT DOCUMENTS

| | | | |
|---|---|---|---|
| EP | 1976164 A2 | | 10/2008 |
| EP | 2034642 A1 | | 3/2009 |
| EP | 2299613 A1 | | 3/2011 |
| FI | WO0150674 A1 * | | 7/2008 |

OTHER PUBLICATIONS

C. Na, R. L. Scheiterer, D. Obradovic, A Kalman Filter Approach to Clock Synchronization of Cascaded Network Elements, 1st IFAC Workshop on Estimation and Control of Networked Systems (NecSys'09), Sep. 24-26, 2009, Venedig, Italien.

C. Na, P. Wolfrum, D. Obradovic, und R. L. Scheiterer, Optimal estimation and control of clock synchronization following the precision time protocol, Proc. of MSC 2010, Yokohama, Japan, 2010.

Wolfrum P et al., "An optimal control approach to clock synchronization", Precision Clock Synchronization for Measurement Control and Communication (ISPCS), 2010 International IEEE Symposium On, IEEE, Piscataway, NJ, USA, (Sep. 27, 2010), pp. 122-128.

Chongning Na et al: "Optimal estimation and control of clock synchronization following the Precision Time Protocol", Control Applications (CCA), 2010 IEEE International Conference On, IEEE, Piscatway, NJ, USA, (Sep. 8, 2008), pp. 1767-1772.

* cited by examiner

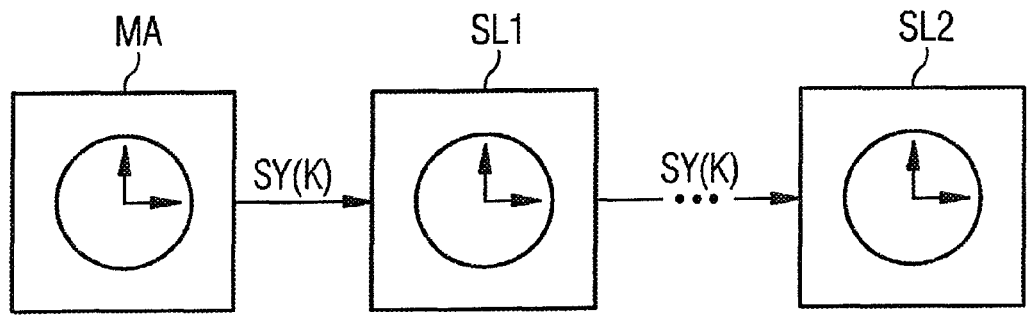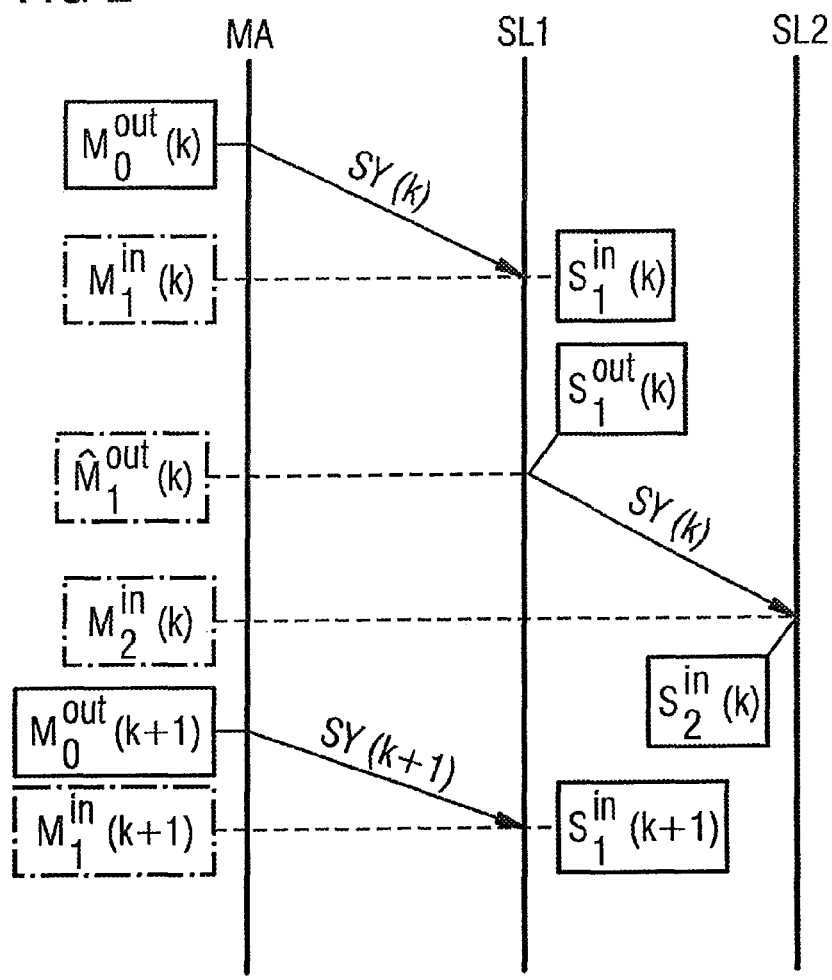

METHOD FOR TIME SYNCHRONIZATION IN A COMMUNICATIONS NETWORK

CROSS-REFERENCE TO RELATED APPLICATIONS

This is a U.S. national stage of application No. PCT/EP2011/065126 filed 1 Sep. 2011. Priority is claimed on European Application No. 10179498.0 filed 24 Sep. 2010, the content of which is incorporated herein by reference in its entirety.

BACKGROUND OF THE INVENTION

1. Field of the Invention

The invention relates to a method for time synchronization in a communications network, and a node in a communications network and a corresponding communications network.

2. Description of the Related Art

In many technical fields, communications networks are used to automatically execute distributed processes on a multitude of units. For industrial automation networks in particular, it is very important that the automatic processes be precisely coordinated with one another. To this end, the individual nodes in the communications network include suitable clocks, which are synchronized to a reference clock in a reference node. The reference node is often known as the master node, while the other nodes with their internal clocks are generally called slave nodes.

Protocols known from the prior art for the synchronization of the clocks in a communications network are specified in the industrial standards Institute of Electrical and Electronic Engineers (IEEE) 1588, IEEE1588v2, International Electrotechnical Commission (IEC) 61158 and IEEE 802.1AS. Synchronization messages are exchanged in the form of time-stamped packages according to these protocols.

A synchronization message originating from a master node is transmitted sequentially between the slave nodes. The synchronization message originating from the master node contains a time stamp of the first cycle counter state according to the reference clock at the time the message is sent. The slave nodes process this information and send out new synchronization messages. In doing so, each slave node adds to the first cycle counter state in the synchronization message received the estimated time lapse between the time of transmission of the synchronization message in the previous node and its own time of transmission. The cycle counter state resulting from this process is included in the synchronization message to be sent out. Optionally, a slave node can also store the first cycle counter state from the synchronization message sent out from the master node in a first field, and add the estimated time lapses in a second, separate field. Based on the information in the synchronization messages received, each slave node can synchronize its second cycle counter states according to its internal clock with the first cycle counter states according to the reference clock. The concept of the cycle counter state is to be interpreted broadly here and in the following, and in particular also with regard to the invention. For example, a cycle counter state can also be understood as a time (e.g., in nanoseconds).

One problem in synchronizing the clocks as described above is that, due to measurement errors in determining the time, varying frequencies of the individual clocks, random environmental effects, and unknown variations concerning the time delay between the receipt and transmission of synchronization messages, the internal clocks of the slave nodes cannot be sufficiently precisely attuned to the reference clock of the master node.

In order to address the aforementioned uncertainties in the synchronization of the clocks, it is known from the publication C. Na, R. L. Scheiterer, D. Obradovic, "A Kalman Filter Approach To Clock Synchronization Of Cascaded Network Elements", 1st IFAC Workshop on Estimation and Control of Networked Systems (NecSys '09), 24-26 Sep. 2009, Venice, Italy (Na1 et al.) and from a European patent application No. 09 012 028.8 on which the publication is based, to estimate the first cycle counter states in each slave node and to synchronize the internal clocks with the reference clock by the estimated first cycle counter states, based on a probabilistic model for state variables of the nodes. The progress of the second cycle counter states of the respective second nodes is not constant, depending on first cycle counter states, and jumps may occur when a new synchronization message is received that results in the updating of the synchronization.

In the publication C. Na, P. Wolfrum, D. Obradovic, and R. L. Scheiterer, "Optimal estimation and control of clock synchronization following the precision time protocol", Proc. of MSC 2010, Yokohama, Japan, 2010 (Na2 et al.) as well as a German patent application No. 10 2010 022 525.8 upon which the publication is based, a synchronization method is described in which first cycle counter states in a slave node are estimated by a Kalman filter, and a regulated first cycle counter state representing the synchronized time is determined from these first estimated cycle counter states with the aid of a regulation based on a linear quadratic regulator. In this method, a compensation factor is used that represents the current clock ratio of the reference clock frequency of the reference clock of the master node to the clock frequency of the internal clock of a slave node. This compensation factor is estimated based on an inherently known method; this estimate is, however, flawed, because it does not model any variations of the clock frequency.

SUMMARY OF THE INVENTION

It is therefore an object of the invention to provide a time synchronization in a communications network that is highly precise and regular across time.

This object and other objects and advantages are achieved in accordance with the invention by a method that provides a time synchronization in a communications network having multiple nodes, where the nodes comprise a first node and one or more second nodes. The first node generates first cycle counter states in accordance with a reference clock frequency, which is based on a reference clock in this node, or which is received by the first node from an absolute time source, e.g., GPS or DCF77. The second node or nodes each generate second cycle counter states according to an internal clock frequency, which is provided by an internal clock in each such second node. The time synchronization is implemented in the method in accordance with the invention in consecutive synchronization cycles, in which synchronization messages originating from the first node are sequentially transmitted from a node to a further node, and a synchronization message sent out from one node contains information that is used for time synchronization in the node receiving the synchronization message.

In the method according to the invention, a time synchronization occurs in a respective second node, at least in some of the second nodes, and in particular in all second nodes, based on the Steps i) and ii) described hereafter. In Step i), a first cycle counter state and a compensation factor, which indicates a current clock ratio of the reference clock frequency to the internal clock frequency of the second node, are estimated for a second cycle counter state measured in such second node, based on an estimation procedure with the aid of the information in a received synchronization message. Subsequently, a regulated first cycle counter state and a regulated compensation factor based on a control loop are determined with the aid of a linear quadratic regulator from the estimated first cycle counter state and the estimated compensation factor, such control loop, as a manipulating variable, containing a correction term for the regulated compensation factor. The regulated first cycle counter state represents the synchronized time.

The method in accordance with the invention is based on the realization that the determination of a regulated first cycle counter state described in the Na2 et al publication and German Patent application No. 10 2010 022 525.8 and based on an estimation procedure and a regulation with a first linear-quadratic regulator can be modified such that a two-dimensional model can be employed to model the dynamics of the first and each second node. This model comprises as a state, in addition to the first cycle counter state of the first node, also the compensation factor representing the cycle ration of the reference clock frequency to the internal clock frequency of the corresponding second node. In this manner, the compensation factor is incorporated as a parameter into the estimation procedure as well as in the regulation with the linear quadratic regulator, and thus this compensation factor need no longer be determined with a separate estimation procedure. As follows from the detailed description, regulated first cycle counter states can be generated with the method in accordance with the invention in a second node, the first cycle counts so generated showing only a minimal error in comparison with the actual first cycle counter states of the first node.

In a particularly preferred embodiment of the method in accordance with the invention, the compensation factor is modeled in the estimation procedure of Step i) such that a variation of the compensation factor based on a stochastic process is contained in this factor, where the stochastic process is preferably represented by a Gaussian process.

In a further preferred embodiment of the method in accordance with the invention, the manipulating variable is updated after every receipt of a synchronization message in the respective second node and supplied to the control loop. In this way, a continuous updating of the synchronization is assured. The manipulating variable is preferably supplied to the control loop via a ZOH (zero order hold) link, in order to illustrate the discrete updates on a continuous dynamic of the control loop.

In a further preferred embodiment of the method in accordance with the invention, the control loop for the linear quadratic regulator at the time of receipt of a synchronization method in the kth synchronization cycle in the nth second node and immediately before an updating of the manipulating variable reads as follows:

$$\begin{bmatrix} CT_n(k) \\ o_n(k) \end{bmatrix} = A_n(k-1) \begin{bmatrix} CT_n(k-1) \\ o_n(k-1) \end{bmatrix} + \begin{bmatrix} 0 \\ 1 \end{bmatrix} \cdot u_n^s(k-1)$$

where $CT_n(k)$ is the regulated first cycle counter state at the time of receipt of the synchronization message in the kth synchronization cycle;
where $o_n(k)$ is the regulated compensation factor at the time of receipt of the synchronization message in the kth synchronization cycle;

where $u_n^s(k-1)$ is the correction term for the regulated compensation factor used in the (k-1)th synchronization cycle;
where $$A_n(k-1) = \begin{bmatrix} 1 & a_n(k-1) \\ 0 & 1 \end{bmatrix};$$

where $a_n(k-1)$ is the time difference between two synchronization messages received consecutively in a given second node, indicated in second cycle counter states according to the internal clock frequency of the nth second node.

The dynamic of the control loop for the linear quadratic regulator after an updating of the manipulating variable at the time of receipt of the synchronization message in the kth synchronization cycle in the nth second node until the next update of the manipulating variable is preferably as follows:

$$CT_n(s) = CT_n(k) + o_n(k) \cdot (s - s_n^{in}(k))$$

where $CT_n(s)$ is the regulated first cycle counter state at the time of a measured second cycle counter state s of the given second node between the two updates;
where $s_n^{in}(k)$ is the measured second cycle counter state of the given second node at the time of receipt of the synchronization message in the kth synchronization cycle.

In an especially preferred embodiment, the first cycle counter state and the compensation factor in Step i) are estimated by an estimation procedure in the form of a stochastic state estimator, and in particular a Kalman filter. The Kalman filter is generally known from the prior art, and estimates an unknown state of a system based on a corresponding state space model, which describes both the change in the state to be estimated (state transition model) and the relationship between the state and corresponding known observables (observation model). The combination of the Kalman filter and linear quadratic regulator provides a particularly good time synchronization.

In an especially preferred embodiment, the first cycle counter state is estimated by an estimation procedure in the form of a Kalman filter, which estimates as a state the first cycle counter state and the compensation factor at the time of receipt of a synchronization message in a given second node and an associated stochastic variance, and uses the information in the stochastic message received as an observable. The information in a synchronization message comprises preferably an estimated first cycle counter state at the time of transmission of the synchronization message in the given second node and an associated stochastic variance. Accordingly, the regulated first cycle counter state is not transmitted as part of a synchronization message, which ensures that the method conforms to existing standards for time synchronization, in particular to the IEEE 1588, IEEE 1588v2, IEC 61158 and IEEE 802.1AS standards referred to at the beginning.

In an especially preferred embodiment of the method in accordance with the invention, the following state space model is used for the Kalman filter in the nth second node for the kth synchronization cycle:

$$\begin{bmatrix} M_n^{in}(k) \\ r_n(k) \end{bmatrix} = A_n(k-1) \begin{bmatrix} M_n^{in}(k-1) \\ r_n(k-1) \end{bmatrix} + \begin{bmatrix} 0 \\ 1 \end{bmatrix} \cdot \omega_n(k-1)$$

$$\hat{M}_{n-1}^{out}(k) = \begin{bmatrix} 1 & -\hat{d}_n(k) \end{bmatrix} \begin{bmatrix} M_n^{in}(k) \\ r_n(k) \end{bmatrix} + v_n(k)$$

where $M_n^{in}(k)$ is the first cycle counter state at the time of receipt of the synchronization message in the nth second node in the kth synchronization cycle;

where $r_n(k)$ is the compensation factor at the time of receipt of the synchronization message in the nth second node in the kth synchronization cycle;

where $\hat{M}_{n-1}^{out}(k)$ is the estimated first cycle counter state at the time of transmission of the synchronization message in the (n−1)th second node or in the first node in the kth synchronization cycle;

where $$A_n(k-1) = \begin{bmatrix} 1 & a_n(k-1) \\ 0 & 1 \end{bmatrix};$$

where $a_n(k-1)$ is the time difference between two synchronization messages received consecutively in a given second node, indicated in second cycle counter states according to the internal clock frequency of the nth second node;

where $\hat{d}_n(k)$ is an estimated time lapse between the transmission time of the synchronization message sent out by the (n−1)th second node and the time of receipt of this synchronization message in the nth second node, indicated in second cycle counter states according to the internal clock frequency of the nth second node;

where $v_n(k)$ is a Gaussian noise term representing an observation noise;

where $\omega_n(k-1)$ is a Gaussian noise term representing a process noise.

A derivation of the state space model described above is found in the detailed description. Corresponding methods for estimating the time delay between receipt and transmission of a synchronization message (a.k.a. line delay) are sufficiently well-known from the prior art. A variant of such a method is described in both the above-described Na1 et al. and Na2 et al. publications.

In a further especially preferred embodiment of the method in accordance with the invention, the estimated first cycle counter state of the subsequent (i.e., retransmitted) synchronization message in a given second node and the associated stochastic variance are calculated with the aid of a node processing time from the first cycle counter state estimated by the Kalman filter and from the compensation factor estimated by the same means at the time of receipt of a synchronization message in the given second node and from the associated stochastic variance and are inserted into the subsequent (i.e., retransmitted) synchronization message, where the node processing time represents an estimated time lapse in the given second node between the receipt of the synchronization message in the given second node and the transmission of the subsequent synchronization message. The estimated delay time can be easily determined by a second node through its local second cycle counter states.

The time synchronization used according to the method in accordance with the invention is preferably based on one of the standards previously mentioned, namely IEEE 1588, IEEE 1588v2, IEC 61588, or IEEE 802.1AS. In a further embodiment, the nodes in the communications network communicate on the basis of the familiar PROFINET standard. In addition, the method in accordance with the invention is preferably used in a communications network in an industrial automation system.

It is also an object of the invention to provide a node for use as a second node in a method for time synchronization in a communications network, where the node for executing the time synchronization is configured as in Steps i) and ii) of the method in accordance with the invention.

It is also an object of the invention to provide a communications network having multiple nodes, where the communications network comprises a first node and at least one second node in accordance with the invention. The communications network is preferably configured to execute one or more of the aforementioned preferred embodiments of the method according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail below on the basis of the attached figures, in which:

FIG. 1 is a schematic representation of multiple nodes in a communications network which exchange synchronization messages in accordance with an embodiment of the invention;

FIG. 2 is a diagram illustrating the transmission of synchronization messages in accordance with an embodiment of the invention;

DETAILED DESCRIPTION OF THE PREFERRED EMBODIMENTS

Figure 3:
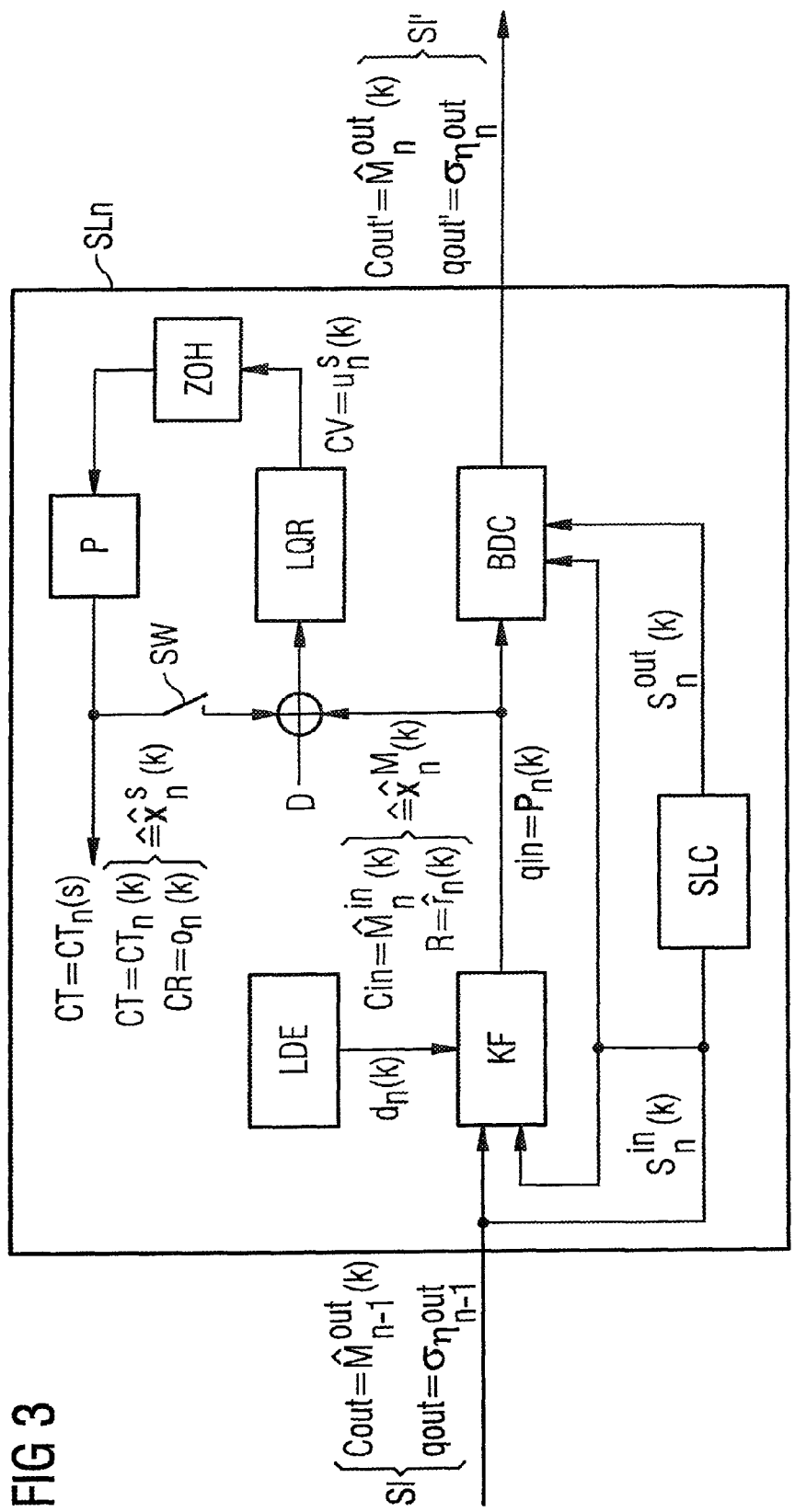
FIG. 3 is a schematic representation of the structure of a second node in a communications network configured to execute an embodiment of the method in accordance with the invention.

FIG. 1 depicts a chain of nodes in a communications network in which an embodiment of the method in accordance with the invention is being executed. The communications network comprises a first node in the form of a master node MA as well as multiple second nodes in the form of slave nodes, two slave nodes, SL1 and SL2, being depicted in FIG. 1. The master node MA contains a reference clock that generates a reference clock frequency. By contrast, the individual slave nodes SL1, SL2, etc. contain separate internal clocks generating corresponding internal clock frequencies. In the communications network in accordance with FIG. 1, a suitable time synchronization protocol, e.g., the PTP (Precision Time Protocol) protocol in accordance with the IEEE 1588 standard, is used to synchronize the internal clock of each slave node with the reference clock of the master node MA. To this end, synchronization messages SY(k) are transmitted from one node to another. Specifically, a synchronization message is sent from the master mode MA to the slave node SL1, then from the slave node SL1 to the slave node SL2, etc., until the last slave node SLN in the chain of slave nodes is reached.

The transmission of synchronization messages is repeated in successive synchronization cycles, where k refers to the current synchronization cycle number. In order to perform a synchronization of the clocks, the synchronization messages SY(k) each contain a time stamp, which represents the cycle counter state of the reference clock at the time the synchronization message was sent out. Cycle counter states of the reference clock shall hereinafter also be referred to as first cycle counter states. The corresponding cycle counter states based on the internal clock of each given slave node are hereinafter also referred to as second cycle counter states. As a synchronization message is transmitted from one slave node to the next, the first cycle counter state in the synchronization message is updated, by adding to the time of the reference clock of the synchronization message previously received the estimated time interval, compensated to master time, between the transmission of the synchronization message by the previous node and the transmission of the message by the current node. This time interval comprises a line delay and a bridge delay. The line delay is the time interval between the transmission of the synchronization message in the preceding node and the receipt of this synchronization message in the current node. The bridge delay, on the other hand, is the time interval between the receipt of a synchronization message in the current node and the transmission of the message to the next node. Line delays and bridge delays are both subject to measurement errors.

In FIG. 2, the three vertical lines represent the measured time in the master node MA, the slave node SL1, and the slave node SL2. The time axis in accordance with these vertical lines runs from top to bottom, i.e., future events are represented on positions located farther down the vertical lines. The reference clock of the master node MA works with the reference clock frequency and the clocks of the slave nodes SL1 and SL2 work with corresponding internal cycle frequencies, which may differ from one another and also from the reference clock frequency. The time in each node is measured on the basis of the corresponding clock of each node, i.e., with the corresponding clock frequency of the clock of the node in question.

In accordance with the diagram of FIG. 2, the master node MA periodically sends out synchronization messages SY(k), SY(k+1), etc. in sequential synchronization cycles, where each synchronization message contains the time-stamped first cycle counter state $M_0^{out}(k)$ or $M_0^{out}(k+1)$. Due to quantization errors or processing fluctuations, the time stamp may deviate from the actual cycle counter state. The synchronization messages are propagated through the network and each slave node updates the relevant synchronization message with a first cycle counter state it estimates for the time of transmission in the corresponding slave node. This first cycle counter state is described for the synchronization message SY(k) in FIG. 2 with $\hat{M}_1^{out}(k)$ in reference to the slave node SL1. In addition, the time-stamped second cycle counter state at the time of transmission of the synchronization message SY(k) in the slave node SL1 is indicated in FIG. 2 with the reference symbol $s_1^{out}(k)$. In the following, variables with a hat (circumflex) represent estimated values of the variable in question. When a synchronization message is received, a slave node SLn generates a time-stamped second cycle counter state $s_n^{in}(k)$ based on its internal clock. In FIG. 2, corresponding time-stamped second cycle counter states generated by the slave node SL1 are denoted by $s_1^{in}(k)$ and $s_1^{in}(k+1)$. A time-stamped second cycle counter state of the slave node SL2 is denoted with the reference symbol $s_2^{in}(k)$. The first cycle counter states corresponding to the second cycle counter states $s_1^{in}(k)$, $s_1^{in}(k+1)$, and $s_2^{in}(k)$ based on the reference clock frequency of the master node MA are illustrated in FIG. 2 with $M_1^{in}(k)$, $M_1^{in}(k+1)$, and $M_2^{in}(k)$.

The time delay between the transmission of a synchronization message from the master node MA and the receipt of this message in the slave node SL1, or between the transmission of a synchronization message by a slave node and its receipt by the next slave node, is known as "line delay". This line delay is estimated by a suitable estimation procedure. As part of this estimation procedure, further messages suitable for determining the line delay are transmitted. Such an estimation procedure is described in the aforementioned IEEE 1588 standard, and is also employed in the method in accordance with the invention described herein. A description of this estimation procedure is also found in the above-described Na2 et al. and Na2 et al. publications. Upon receipt of a synchronization message, a new synchronization message is transmitted from one slave node to the next slave node, after a bridge delay representing the internal processing time in a node. This synchronization message contains the aforementioned estimated first cycle counter state at the time of transmission in the corresponding slave node.

In the synchronization described in FIG. 1 and FIG. 2, the problem arises that uncertainties appear when coordinating the times of the individual clocks with one another, such uncertainties resulting from measurement errors, fluctuations, quantization errors, random frequency drifts, etc. In consequence of these errors, the synchronization of the internal clocks of the slave nodes with the reference clock of the master node is often not sufficiently precise; this is problematic in applications demanding a precise coordination of the clocks in executing combined processes through the nodes of the network. Particularly in the field of industrial automation systems, an exact synchronization of the clocks between the nodes is of great importance.

To achieve such an exact synchronization, the embodiment of the method in accordance with the invention described below combines in the given second node a stochastic state estimator in the form of a Kalman filter with a control loop based on a linear quadratic regulator, as explained in detail with reference to FIG. 3 below. First, however, certain definitions are introduced which shall be used in the following description of FIG. 3.

The definitions are as follows:

$r_n(k)$: The kth RFC ratio, also referred to hereinafter as the compensation factor, and which represents the frequency ratio of the reference clock to the clock frequency of the internal clock of the slave node SLn in the kth synchronization cycle.

$s_n^{in}(k)$: The time-stamped second cycle counter state of the slave node SLn when the kth synchronization message arrives in the slave node SLn.

$M_n^{in}(k)$: The first cycle counter state of the master node at the time that the second cycle counter state of the slave node has the value $s_n^{in}(k)$.

$s_n^{out}(k)$: The time-stamped second cycle counter state of the slave node SLn when the kth synchronization message is transmitted by the slave node SLn.

$\hat{M}_n^{out}(k)$: The first cycle counter state of the master node estimated in the slave node SLn at the time that the second cycle counter state of the slave node SLn has the value $s_n^{out}(k)$.

$a_n(k) = s_n^{in}(k+1) - s_n^{in}(k)$: The local time difference between the arrival of two sequential synchronization messages in the slave node SLn, measured in second cycle counter states of the internal clock of the slave node SLn.

$b_n(k) = s_n^{out}(k) - s_n^{in}(k)$: The bridge delay in the local time according to the second cycle counter states of the slave node SLn.

$d_n(k)$: The line delay in the local time according to the second cycle counter states of the slave node SLn.

FIG. 3 provides a schematic representation of the structure of the nth slave node SLn, which is located at the nth position in the chain of synchronization messages originating from the master node. In the scenario of FIG. 3, the slave node SLn receives a synchronization message containing corresponding synchronization information SI, then, after the processing described below, transmits a new synchronization message with corresponding synchronization information SI'. The components depicted in FIG. 1 permit the generation of a synchronized regulated time, designated CT. By contrast, the unsynchronized internal clock of the slave node SLn in FIG. 1 is denoted with SLC.

In order to estimate the first cycle counter state upon receipt of the synchronization message, the synchronization information SI of the received synchronization message is first supplied to a local Kalman filter KF in the slave node SLn. This synchronization information comprises a first cycle counter state Cout=$\hat{M}_{n-1}^{out}(k)$ estimated in the preceding slave node with corresponding variance qout=$\sigma_{n_{n-1}}^{out}$. This estimated first cycle counter state is determined in the preceding slave node in the same manner as the estimated cycle counter state for the synchronization information SI' is determined in the slave node SLn. The Kalman filter KF, the general structure of which is known from the prior art, estimates based on a state space model further detailed below both the first cycle counter state Cin=$\hat{M}_n^{in}(k)$ and the compensation factor R=$\hat{r}_n(k)$ with the corresponding covariance matrix qin=$P_n(k)$ at the time of receipt of the synchronization message with the synchronization information SI in the slave node SLn. Further parameters used to perform the estimate with the Kalman filter are the line delays $d_n(k)$, which are determined in a line delay estimator LDE using a standard estimate procedure. In addition, the Kalman filter KF employs time-stamped second cycle counter states $s_n^{in}(k)$ measured with the internal clock SLC, based on which it can determine the aforementioned parameter $a_n(k)=s_n^{in}(k+1)-s_n^{in}(k)$.

The estimated values Cin and R, which represent output variables of the Kalman filter KF and form the state vector $\hat{x}_n^M(k)$, are then fed in to an optimal linear quadratic regulator LQR, hereinafter also referred to as an LQR regulator, and by which a regulated first cycle counter state CT and a regulated compensation factor CR is determined based on a control loop PL, as shall be described in further detail. LQR regulation is generally known from the prior art, and the specific embodiment of the regulator used in FIG. 3 is mathematically described in greater detail below. The regulator LQR receives the estimated values Cin and R through the difference link D. The manipulating variable CV=$u_n^s(k)$ of the regulator here represents a correction term for the regulated compensation factor CR=$o_n(k)$. This discrete manipulating variable, which is updated at the time of receipt of a new synchronization message, is fed into a ZOH link (ZOH=zero order hold). This link is sufficiently known from the prior art, and generates a continuous step function from the discrete values of the correction term. The output of the ZOH link is then fed into the control loop PL (PL=Plant), from which a regulated time CT=$CT_n(k)$ in the form of a regulated first cycle counter state and the regulated compensation factor CR corrected by the correction term are determined. The regulated time may also be indicated for intermediate values between the times of two received synchronization messages, as indicated in FIG. 3 by the equation CT=$CT_n(s)$ (see also Equation (34)). The regulated first cycle counter state CT determined through the dynamics of the control loop PL is the synchronized cycle counter state of the slave node.

In FIG. 3, a switch SW reflects that the regulated first cycle counter state CT is also fed into the difference link D with every recalculation of Cin triggered by the receipt of a new synchronization message, where the link D calculates the difference between Cin and CT and between R and CR. This difference is then fed into the LQR regulator.

In order that the slave node of FIG. 3 again generates suitable synchronization information for a synchronization message to be transmitted, the outputs Cin and qin of the Kalman filter KF are fed into the component BDC, which compensates for the bridge delay and thus generates, from the estimated first cycle counter state Cin=$\hat{M}_n^{in}(k)$ and the estimated compensation factor R=$\hat{r}_n(k)$ at the time of receipt of the synchronization message and the associated covariance, an estimated first cycle counter state Cout'=$\hat{M}_n^{out}(k)$ at the time of transmission of the next synchronization message with associated variance qout'=$\sigma_{n_n}^{out}$. These generated values are integrated into the synchronization message transmitted by the slave node SLn as new synchronization information SI'. The calculation performed by the component BDC is explained in greater detail below. In it, second cycle counter states $s_n^{in}(k)$ and $s_n^{out}(k)$ measured in the local time of the slave node are used in addition to the outputs of the Kalman filter to determine the bridge delay $b_n(k)$.

In the following, the individual calculations performed by the components illustrated in FIG. 3 are described in detail. First, the model used to describe the dynamic of the master time according to the first cycle counter state for the slave node SLn is described. This dynamic is hereinafter also referred to as the master dynamic. As can be seen from FIG. 2, the difference $M_n^{in}(k+1)-M_n^{in}(k)$ and the difference $s_n^{in}(k+1)-s_n^{in}(k)$ correspond to the same time interval measured in the master time according to the reference clock frequency or the slave time according to the clock frequency of the internal clock of the slave node SLn. The parameter $$a_n(k)=s_n^{in}(k+1)-s_n^{in}(k) \qquad \text{Eq. (1)}$$

described above describes the number of local second cycle counter states between two arriving synchronization messages. On this basis, the master dynamic from the perspective of the slave node SLn can be described as follows:

$$M_n^{in}(k+1)=M_n^{in}(k)+a_n(k)\cdot r_n(k) \qquad \text{Eq. (2).}$$

The compensation factor $r_n(k)$ defined previously compensates here for the frequency difference between the master time of the master node and the internal clock of the slave node. The compensation factor $r_n$ is itself a dynamic variable dependent on the evolution over time of the frequencies of the master node MA and the slave node SLn. These frequencies in turn are affected by external disturbances, such as temperature changes, vibrations, etc. In the embodiment of the invention described here, the compensation factor $r_n$ is modeled as a random walk, as follows:

$$r_n(k+1)=r_n(k)+\omega_n(k) \qquad \text{Eq. (3).}$$

$\omega_n$ here represents a Gaussian white noise with an appropriate standard deviation, as described in further detail below. In contrast to the method known from the Na2 et al. publication and German Patent Application No. 10 2010 022 525.8, the state space modeled now also comprises, in addition to the first cycle counter state, the compensation factor. The state of the master node is thus two-dimensional, and is described by the following vector:

$$x_n^M(k)=[M_n^{in}(k)\, r_n(k)]^T \qquad \text{Eq. (4).}$$

The master dynamic can be described with the following equation, which represents the state transition model that is processed in the Kalman filter described below:

$$S^M : x_n^M(k+1) = \underbrace{\begin{bmatrix} 1 & a_n(k) \\ 0 & 1 \end{bmatrix}}_{A_n(k)} x_n^M(k) + \underbrace{\begin{bmatrix} 0 \\ 1 \end{bmatrix}}_{B^\omega} \omega_n(k). \qquad \text{Eq. (5)}$$

A synchronization of the slave SLn to the master time, which optimally employs the knowledge of the preceding master dynamic $S^M$, is achieved in that the master dynamic is followed by a virtual model present locally in the slave node SLn. On this basis, a local state vector in the slave node SLn with the following regulated parameters is introduced:

$$x_n^S(k) = [CT_n(k) o_n(k)]^T \qquad \text{Eq. (6).}$$

$CT_n$ corresponds here to the regulated time previously mentioned (CT=Control Time), which represents the current estimate of the master time upon receipt of a synchronization message. This regulated time is determined in the course of the method described here, and represents the synchronization time. The aforementioned parameter $o_n$ here represents the regulated compensation factor, which is also referred to as OFC (OFC=Offset Compensation Factor). This represents an estimate of the RFC ratio, and compensates for the frequency differences and the displacement of the cycle counter states between the slave node SLn and the master node MA. The local virtual model of the master dynamic has the same dynamic structure as the master dynamic $S^M$. In contrast to the master dynamic, however, it is noise-free, as it is a virtual model which can be controlled to ensure that this model follows the master dynamic. The local virtual model in the slave node SLn, hereinafter also referred to as the slave dynamic, is thus described by means of the following equation:

$$S^S : x_n^S(k+1) = A_n(k) x_n^S(k) + \underbrace{\begin{bmatrix} 0 \\ 1 \end{bmatrix}}_{B} u_n^S(k). \qquad \text{Eq. (7)}$$

In this model, the correction term or correction variable $u_n^S$ is introduced, which influences the slave dynamic in the same way that the master dynamic is influenced by the process noise $\omega_n$.

To ensure that the master state vector $x_n^M$ is followed by the local slave state vector $x_n^S$, the following difference signal must be stabilized:

$$x_n^D := x_n^M - x_n^S \qquad \text{Eq. (8).}$$

In consequence of the identical structure of the master dynamic $S^M$ and the slave dynamic $S^S$ (see Eqs. (5) and (7)), the difference model can be written as follows:

$$S^D : x_n^D(k+1) = A_n(k) x_n^D(k) + B u_n^D(k) + B^\omega \omega_n(k) \qquad \text{Eq. (9)}$$

The input parameter in this difference model is defined as follows:

$$u_n^D(k) := u_n^M(k) - u_n^S(k) = -u_n^S(k) \qquad \text{Eq. (10).}$$

The parameter $u_n^M(k)$ is set equal to zero here, as the master dynamic has no regulator input. Like the models $S^M$ and $S^S$, the difference model $S^D$ is an event-driven system, which results in the fact that the matrix $A_n(k)$ defined above is temporally variable. In the regulation based on a linear quadratic regulator described below, the model $S^D$ is assumed as approximately time-invariant, i.e., the aforementioned parameter $a_n(k)$ is taken as constant.

To stabilize the difference model $S^D$, the following LQR cost function is minimized in the embodiment described here:

$$J = \sum_n \left( x_n^D(k)^T Q x_n^D(k) + u_n^D(k) r u_n^D(k) \right). \qquad \text{Eq. (11)}$$

Q and r here denote weighting parameters, which may be specified as appropriate by one skilled in the art. As the dynamic $S^D$ is linear, the problem can be solved with a linear quadratic regulator which is known per se. As the linear quadratic regulator is a state feedback regulator, it requires knowledge of the state $x_n^D$. However, the state $x_n^D$ cannot be measured directly; only a noisy observation of this state can be made. From this observation, which is defined below in Equation (13) and which contains measurement noise, an estimated value $\hat{x}_n^D$ of the state vector $x_n^D$ can be determined with the aid of a Kalman filter.

In the difference signal $x_n^D = x_n^M - x_n^S$, the state $x_n^S$ is not disturbed by noise, as it is a virtual variable known precisely in the slave node SLn. Thus, only the master state $x_n^M$ need be estimated from a corresponding noisy observation $y_n^M$ of this state. This estimate is made by the Kalman filter described below. As the master dynamic is independent of the aforementioned control signal $u_n^D$, the master state $x_n^M$ can be estimated outside the corresponding control loop. The Kalman filter can thus be arranged outside the control loop, which has the benefit that this structure is compatible with the concept of a transparent clock that is not disturbed by a regulation. This concept is realized in particular in the IEEE 1588v2 standard previously mentioned, thus the invention described here is compatible with this standard.

As the estimation of the master state $x_n^M$ is not a part of the control loop, the control loop designated as PL in FIG. 3 thus describes not the difference model $S^D$, but only the slave dynamic $S^S$. Accordingly, the control signal $u_n^D$ generated by the linear quadratic regulator must be converted into the control signal $u_n^S$, which represents the manipulating variable CV of the regulator. This can be achieved in accordance with Equation (10) above through a multiplication by −1.

In the following, the estimation of the state based on the master dynamic $S^M$ from Equation (5) is described with the aid of the Kalman filter KF. The observations available to the Kalman filter in this case are the corresponding synchronization messages with the synchronization information SI received by the slave node SLn. As already explained, this synchronization information includes the first cycle counter state $\hat{M}_{n-1}^{out}(k)$ estimated in the preceding slave node at the time of transmission of the synchronization message. The actual value $M_{n-1}^{out}(k)$ of this first cycle counter state is related to the first cycle counter state upon receipt of the synchronization message by the slave node SLn through the line delay $d_n(k)$ as follows:

$$M_n^{in}(k) = M_{n-1}^{out}(k) + d_n(k) r_n(k) \qquad \text{Eq. (12).}$$

The observation model of the Kalman filter can thus be written as follows:

$$y_n^M(k) := \hat{M}_{n-1}^{out}(k) = \underbrace{M_n^{in}(k) - d_n(k) \cdot r_n(k) + Rauschen}_{C_n(k)} = [1 - \hat{d}_n(k)] x_n^M(k) + v_n(k). \quad \text{Eq. (13)}$$

The pair $(A_n(k), C_n(k))$ is observable for all realistic values of $a_n(k)$ and $\hat{d}_n(k)$, thus the state $x_n^M(k)$ can be reconstructed.

In order for the Kalman filter KF of FIG. 3 to function optimally, the observation noise $v_n$, and the process noise $\omega_n$ must be suitably quantified. An analysis of the observation process shows that $v_n$, can be divided into various noise terms in accordance with the following equation; the time index k is omitted for clarity:

$$v_n = \eta_{n-1}^{out} \xi_{n-1} + \eta_{d,n} \cdot r_n \quad \text{Eq. (14)}$$

There are also second-order effects, but these can be ignored.

The terms of Equation (14) are elaborated as follows:

$\eta_{n-1}^{out}$ is the primary contributor to the observation noise. This contribution represents the error in the estimation of the master time in the slave node SL(n−1). The variance of this error is automatically estimated in the slave node SL(n−1) during the estimation process of the Kalman filter and provided to the slave node SLn as variable qout as part of the synchronization information SI.

$\xi_{n-1}$ the "stamping jitter" resulting from the time stamping. This jitter appears when the synchronization message is transmitted from the slave node SL(n−1). The determination of this parameter is a matter of professional skill. It may be easily derived from the hardware characteristics of the slave node in question.

$\eta_{d,n}$ is the error in the line delay caused by the estimation procedure used for this parameter. This error affects the observation $y_n^M$ via the model uncertainty of the observation matrix $C_n$. The error thus depends on the estimation procedure used for the line delay.

Based on the above observations, a person skilled in the art can identify a suitable noise term $v_n$ for the observation noise in the form of a Gaussian noise term with corresponding variance $\sigma_{v_n}$. Unlike the observation noise, the process noise $\omega_n$ reflects the fact that the RFC ratio is not fixed, but changes based on external disturbances in the nodes. These effects are roughly approximated in the embodiment described herein by a Gaussian additive noise, where the selection of a corresponding variance $\sigma_{\omega_n}$ for this noise is a matter of professional judgment.

Based on the state transition model $S^M$ from Equation (5) and the observation model from Equation (13), as well as the appropriately quantified variances $\sigma_{v_n}$ and $\sigma_{\omega_n}$, the estimation can be derived in the manner known per se by means of the Kalman filter. The estimation carried out by the Kalman filter KF of FIG. 3 is briefly explained below.

The following matrix is introduced in the course of the estimation:

$$Q_n(k) = \begin{bmatrix} 0 & 0 \\ 0 & \sigma_{\omega_n}(k) \end{bmatrix}. \quad \text{Eq. (15)}$$

In addition, $P_n(k)$ hereinafter denotes the covariance matrix. The estimation process consists of the following calculations.

First, a state is predicted in accordance with the Kalman filter as follows:

$$\hat{x}_n^{M,-}(k) = A_n(k-1) \hat{x}_n^M(k-1) \quad \text{Eq. (16).}$$

The predicted variance is as follows:

$$P_n^-(k) = A_n(k-1) P_n(k-1) A_n(k-1)^T + Q_n(k-1) \quad \text{Eq. (17)}$$

The Kalman gain is determined on the basis of the following equation:

$$L_n(k) = P_n^-(k) C_n(k) C_n(k)^T (C_n(k) P_n^-(k) C_n(k)^T + \sigma_{v_n}(k))^{-1} \quad \text{Eq. (18).}$$

From this, the following updated value for the state is found, where $y_n(k)$ represents the above parameter $\hat{M}_{n-1}^{out}(k)$ from the synchronization message received:

$$\hat{x}_n^M(k) = \hat{x}_n^{M,-}(k) + L_n(k)(y_n(k) - C_n(k) \hat{x}_n^{M,-}(k)) \quad \text{Eq. (19)}$$

The updated variance here reads as follows:

$$P_n(k) = (I - L_n(k) C_n(k)) P_n^-(k) \quad \text{Eq. (20).}$$

The Kalman filter thus estimates the corresponding first cycle counter state $M_n^{in}(k)$ when the synchronization message arrives in the slave node SLn. The Kalman filter also provides an estimated compensation factor $\hat{r}_n(k)$. For the next synchronization message to be transmitted by the slave node SLn, an estimation of the first cycle counter state $M_n^{out}(k)$ must also be made, which is then included in the next synchronization message. The value for this estimate is determined on the basis of the following equation:

$$\hat{M}_{n-1}^{out}(k) = \hat{M}_n^{in}(k) + b_n(k) \hat{r}_n(k) \quad \text{Eq. (21).}$$

The calculation according the Equation (21) above is executed by the BDC unit of FIG. 3. The corresponding variance gout', which is also integrated in the next synchronization message, is estimated as the uncertainty in estimating the master time upon receipt of the synchronization message plus the variance in the assumed bridge delay, which results from the uncertainty in the RFC ratio. The following variance $\sigma_{\eta_n^{out}}$ thus results for gout', where $p^{x,y}$ denotes corresponding entries of the covariance matrix P:

$$\sigma_{\eta_n^{out}} = p_n^{1,1} + b_n^2 \cdot p_n^{2,2} \quad \text{Eq. (22)}$$

This variance, as well as the estimated first cycle counter state $\hat{M}_n^{out}(k)$ from the state vector $\hat{x}_n^M(k)$ of Equation (19) are incorporated as synchronization information SI' into the synchronization message transmitted by the slave node SLn.

In the following, the regulation based on the linear quadratic regulator of FIG. 3 shall be explained. The regulation is based on the slave dynamic $S^S$ from Equation (7) previously described. As mentioned above, a time-invariant system is assumed, which enables the use of the stationary form of the linear quadratic regulator. In this time-invariant system, the number of second cycle counter states of the slave node SLn between two synchronization messages is taken to be constant, i.e.:

$$a_n(k) \equiv a_n \quad \text{Eq. (23).}$$

This results in a time-invariant slave dynamic, as follows:

$$S^{S,inv}: x_n^S(k+1) = A x_n^S(k) + B u_n^S(k) \quad \text{Eq. (24).}$$

In order to realize a linear quadratic regulator according to which the slave dynamic follows the master dynamic, the aforementioned mentioned cost function is minimized in accordance with Equation (11). To determine the LQR gain, the following time-discrete algebraic Riccati equation (a.k.a. DARE) is solved:

$$P = Q + A^T (P - PB(r + B^T PB)^{-1} B^T P) \quad \text{2nd left (delete(25)).}$$

The matrix Q is symmetrical here, and reads as follows:

$$Q = \begin{bmatrix} q_1 & 0 \\ 0 & q_2 \end{bmatrix}. \quad \text{Eq. (26)}$$

Based on the matrix Q, Equation (25) can be described by the following three equations:

$$-\frac{p_2^4}{q_1^2} + \frac{a}{q_1}p_2^3 + \frac{2r+q_2}{q_1}p_2^2 + arp_2 - r^2 = 0, \quad \text{Eq. (27)}$$

$$p_1 = q_1 + \frac{p_2}{a} - \frac{rq_1}{ap_2}, \quad \text{Eq. (28)}$$

$$p_3 = \frac{p_2^2}{q_1} - r, \quad \text{Eq. (29)}$$

where $$P = \begin{bmatrix} p_1 & p_2 \\ p_2 & p_3 \end{bmatrix}. \quad \text{Eq. (30)}$$

Equation (27) above cannot be solved in closed form. In the embodiment described here, however, r=0 is assumed, which is equivalent to saying that changing the regulated compensation factor will go unpunished. In consequence, Equation (27) can be written as follows:

$$p_2 = \frac{aq_1 + \sqrt{a^2 q_1^2 + 4q_1 q_2}}{2}. \quad \text{Eq. (31)}$$

Hence the aforementioned matrix P can be calculated in closed form.

After the matrix P has been determined based on the equations above, the LQR gain is found as follows:

$$K = -(R + B^T P B)^{-1} B^T P A \quad \text{Eq. (32)}$$

From this, the following value is obtained for the manipulating variable $u_n^S(k)$ of the regulator:

$$u_n^S(k) = -K(\hat{c}_n^M(k) - x_n^S(k)) \quad \text{Eq. (33)}$$

By means of the combination of the Kalman filter with the LQR regulator as described above, a solution of the LQG problem (LQG=Linear Quadratic Gaussian) known from the prior art is obtained. An important distinction between the output of the Kalman filter and the regulated time CT determined via the LQR regulator is that the regulated time can be extrapolated in a continuous function without jumps. This trait is necessary for many applications which use the output of the regulated time in a slave node. The first cycle counter state Cin at receipt of a synchronization message until receipt of the next synchronization message estimated by the Kalman filter could certainly be extrapolated on the basis of the estimated RCF ratio $\hat{r}_n(k)$. However, the outcome of this extrapolation is not consistent with the next estimation of the Kalman filter due to the innovation at time k+1, thus the parameter Cin is not extrapolated. Nonetheless, the regulated first cycle counter state CT between the time of receipt of the kth synchronization message and the time of receipt of the (k+1)th synchronization message can be determined for each local second cycle counter state s as follows:

$$CT_n(s) = CT_n(k) + o_n(k) \cdot (s - s_n^{in}(k)) \quad \text{Eq. (34)}.$$

This extrapolation thus constantly carries the value $CT_n(k)$ over to the next discrete value $CT_n(k+1)$, as the slave dynamic is a virtual noise free-process, which is driven only by the regulated compensation factor $o_n$.

The regulated time CT determined in the slave node of FIG. 3 is used by the node as a basis for executing relevant processes. However, the regulated time is not transmitted to the next node as part of the transmission of the next synchronization message. Rather, the time $\hat{M}n^{out}$ estimated by the Kalman filter is transmitted to the next slave node, such time not being affected by the LQR regulator.

The method described above was tested by the inventors based on simulations and compared with a standard method in which a slave node calculates the first cycle counter state without modeling fluctuations when determining the time. To test the performance of the synchronization method in accordance with the invention under real-world conditions, external disturbances in the network, such as temperature fluctuations or vibrations, were simulated. The simulations were run for a network consisting of 200 nodes, which were interconnected based on the topology of FIG. 1.

Figure 4:
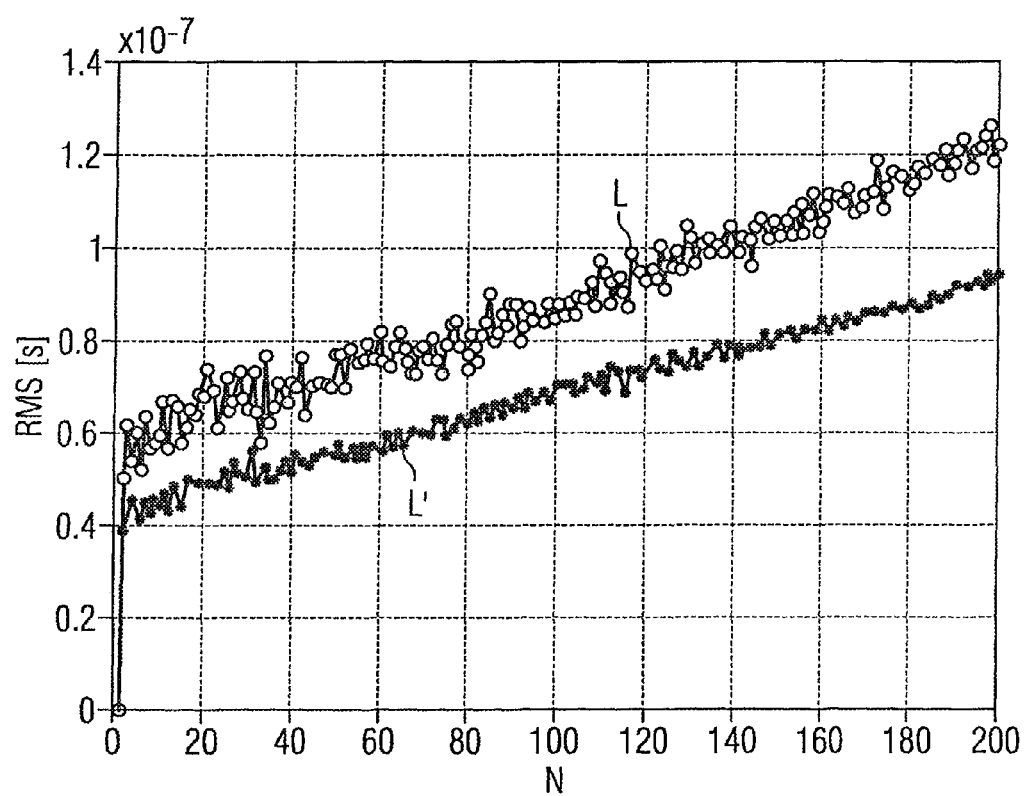
FIG. 4 is a graphical plot of a diagram comparing results of the synchronization method in accordance with the invention with those of a standard synchronization method.

FIG. 4 depicts a diagram comparing the simulation-based results of the method in accordance with the invention with the standard method. The abscissa of the diagram indicates the corresponding number N of the slave node, where the number 0 denotes the master node. The root in seconds of the mean quadratic error RMS between the master time determined in a given slave node and the actual master time is given on the ordinate axis. Line L indicates the standard method, and Line L' the method in accordance with the invention. It is plainly visible from FIG. 4 that the determination of the regulated time on the basis of a Kalman filter and an LQR regulator results in significantly reduced error as compared with the standard method. In the case of an assumed synchronization precision requirement of 80 ns, the standard method supports only 59 slave nodes, while 146 slave nodes can be supported using the method in accordance with the invention, more than doubling performance.

Figure 5:
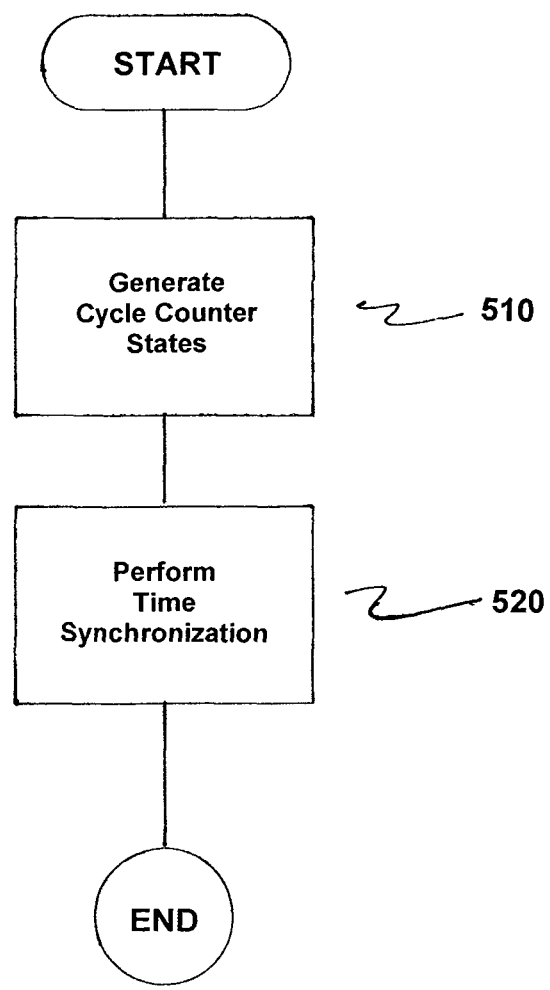
FIG. 5 is a flowchart of the method in accordance with the invention.

FIG. 5 is a flowchart of the method for time synchronization in a communications network having multiple nodes, where the nodes comprise a first node and at least one second node. The method comprises generating, by the first node, first cycle counter states according to a reference clock frequency and generating, by the at least one second node, a second cycle counter state in accordance with an internal clock frequency, as indicated in step 510.

Next, a time synchronization is performed in sequential synchronization cycles such that synchronization messages originating from the first node are sequentially transmitted from one node to another node, and such that a synchronization message transmitted by a node contains information used for time synchronization in the node receiving the synchronization message, as indicated in step 520. Here, time synchronization in a specific second node of at least a part of the at least one second node is implemented such that i) a first cycle counter state and a compensation factor, which represents a current clock ratio of the reference clock frequency to the internal clock frequency of the specific second node, are estimated for a second cycle counter state measured in a specific second node, based on an estimation procedure aided by information contained in a received synchronization message, and ii) a regulated first cycle counter state and a regulated compensation factor based on a control loop are determined from the estimated first cycle counter state and the estimated compensation factor by a linear quadratic regulator which includes a correction term for a regulated compensation factor as a manipulating variable, the regulated first cycle counter state representing the synchronized time.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for time synchronization in a communications network having a first node and at least one second node, comprising:
   i) sending, within a synchronization cycle, a synchronization message from the first node to the at least one second node; and
   ii) providing, by the first node, a first cycle counter state in accordance with a reference clock frequency and providing, by a respective second node of the at least one second node, a second cycle counter state in accordance with an internal clock frequency;
   wherein time synchronization of the respective second node of the at least one second node is implemented such that:
   (a) the synchronization message is received at the respective second node;
   (b) an estimated first cycle counter state and an estimated compensation factor are estimated for a measured second cycle counter state of the respective second node based on information contained in the received synchronization message by a stochastic state estimator, the estimated first cycle counter state estimating the first cycle counter state of the first node for a point in time at which the synchronization message is received by the respective second node, and the estimated compensation factor estimating a duty cycle ratio of the reference clock frequency to a respective internal clock frequency for the synchronization cycle;
   (c) a linear-quadratic regulator is utilized to determine from both the estimated first cycle counter state and the estimated compensator factor a controlled first cycle counter state and a controlled compensation factor based on a controlled system which contains a correction term for the controlled compensation factor as a control variable, the controlled compensation factor estimating a duty cycle ratio of the reference clock frequency to the respective internal clock frequency, and the controlled first cycle counter state indicating a synchronized timing; and
   (d) a two-dimensional model is utilized for the stochastic state estimator and the linear-quadratic regulator, the two-dimensional model comprising the estimated first cycle counter and the estimated compensation factor as states.

2. The method in accordance with claim 1, wherein, in step b), a variation of the compensation factor based on a stochastic process is modeled.

3. The method in accordance with claim 1, wherein the control variable is updated after each receipt of the synchronization message in the respective second node and supplied to a control loop.

4. The method in accordance with claim 2, wherein the control variable is updated after each receipt of the synchronization message in the respective second node and supplied to a control loop.

5. The method in accordance with claim 3, wherein the control loop for the linear-quadratic regulator at a time of receipt of the synchronization message in a kth synchronization cycle in an nth second node and immediately before an updating of the manipulating variable is in accordance with the following relationship:

$$\begin{bmatrix} CT_n(k) \\ o_n(k) \end{bmatrix} = A_n(k-1) \begin{bmatrix} CT_n(k-1) \\ o_n(k-1) \end{bmatrix} + \begin{bmatrix} 0 \\ 1 \end{bmatrix} \cdot u_n^s(k-1);$$

where $CT_n(k)$ is the regulated first cycle counter state at the time of receipt of the synchronization message in the kth synchronization cycle;
where $o_n(k)$ is the regulated compensation factor at the time of receipt of the synchronization message in the kth synchronization cycle;
where $u_n^s(k-1)$ is a correction term for the regulated compensation factor used in a kth synchronization cycle;
where $$A_n(k-1) = \begin{bmatrix} 1 & a_n(k-1) \\ 0 & 1 \end{bmatrix};$$

and
where $a_n(k-1)$ is a time difference between two synchronization messages received sequentially in the specific second node, indicated in second cycle counter states according to an internal clock frequency of the nth second node.

6. The method in accordance with claim 5, wherein the control loop for the linear-quadratic regulator after the updating of the control variable at the time of receipt of the synchronization message in the kth synchronization cycle in the nth second node until a next updating of the manipulating variable is in accordance with the following relationship:

$$CT_n(s) = CT_n(k) + o_n(k) \cdot (s - s_n^{in}(k)));$$

where $CT_n(s)$ is the regulated first cycle counter state at the time of a measured second cycle counter state s of the respective second node between two updates; and where $s_n^{in}(k)$ is the measured second cycle counter state of the respective second node at the time of receipt of the synchronization message in the kth synchronization cycle.

7. The method in accordance with claim 1, wherein the first cycle counter state and the compensation factor are estimated by an estimation procedure comprising a Kalman filter, which estimates as states of the first cycle counter state and the compensation factor at the time of receipt of the synchronization message in the respective second node and an associated stochastic variance, and utilizes, as an observable, information contained in the received synchronization message.

8. The method in accordance with claim 7, wherein the information in the synchronization message comprises an estimated first cycle counter state at a time of transmission of the synchronization message in a corresponding respective second node and an associated stochastic variance.

9. The method in accordance with claim 8, wherein a state space model is used for the Kalman filter in an nth second node for the kth synchronization cycle in accordance with the following relationship:

$$\begin{bmatrix} M_n^{in}(k) \\ r_n(k) \end{bmatrix} = A_n(k-1) \begin{bmatrix} M_n^{in}(k-1) \\ r_n(k-1) \end{bmatrix} + \begin{bmatrix} 0 \\ 1 \end{bmatrix} \cdot \omega_n(k-1);$$

$$\hat{M}_{n-1}^{out}(k) = \begin{bmatrix} 1 & -\hat{d}_n(k) \end{bmatrix} \begin{bmatrix} M_n^{in}(k) \\ r_n(k) \end{bmatrix} + v_n(k);$$

where $M_n^{in}(k)$ is the first cycle counter state at the time of receipt of the synchronization message in the nth second node in the kth synchronization cycle;

where $r_n(k)$ is the compensation factor at the time of receipt of the synchronization message in the nth second node in the kth synchronization cycle;

where $\hat{M}_{n-1}^{out}(k)$ is the estimated first cycle counter state at the time of transmission of the synchronization message in one of an nth second node and in the first node in the kth synchronization cycle;

where $$A_n(k-1) = \begin{bmatrix} 1 & a_n(k-1) \\ 0 & 1 \end{bmatrix};$$

where $a_n$ (k−1) is a time difference between two synchronization messages received sequentially in the respective second node, indicated in second cycle counter states according to an internal clock frequency of the nth second node;

where $\hat{d}_n(k)$ is an estimated time delay between the time of transmission of the synchronization message sent out by the nth node and the time of receipt of this synchronization message in the nth second node, indicated in second cycle counter states according to the internal clock frequency of the nth second node;

where $v_n(k)$ is a Gaussian noise term representing an observation noise; and where $\omega_n(k-1)$ is a Gaussian noise term representing a process noise.

10. The method in accordance with claim 9, wherein the estimated first cycle counter state of the subsequent synchronization message in the respective second node and the associated stochastic variance are calculated aided by a node processing time from the first cycle counter state estimated by the Kalman filter and from the compensation factor estimated in a same way at the time of receipt of a synchronization message in the respective second node and from the associated stochastic variance and are inserted into a subsequent synchronization message, a node processing time representing an estimated time lapse in the respective second node between the receipt of the synchronization message received in the respective second node and transmission of the subsequent synchronization message.

11. The method in accordance with claim 1, wherein the time synchronization is based on one of Institute of Electrical and Electronic Engineers 1588 or IEEE1588v2 or International Electrotechnical Commission 61588 and IEEE 802.1AS standard.

12. The method in accordance with claim 1, wherein nodes communicate with one another based on the PROFINET standard.

13. The method in accordance with claim 1, wherein the method is implemented in an industrial automation system.

14. The method in accordance with claim 8, wherein the stochastic process is a Gaussian noise process.

15. The method in accordance with claim 3, wherein the control variable is supplied to the control loop via a zero order hold link.

16. The method in accordance with claim 1, wherein the stochastic state estimator is a Kalman filter.

17. A node for use as a second node in a method for time synchronization in a communications network having a plurality of nodes, each of the plurality of nodes comprising a first node and the node, a synchronization message being sent from the first node to the node within a synchronization cycle, the first node providing a first cycle counter state in accordance with a reference clock frequency and the node providing a second cycle counter state in accordance with an internal clock frequency;

wherein the node is configured to implement time synchronization such that:
(a) the synchronization message is received at the node;
(b) an estimated first cycle counter state and an estimated compensation factor are estimated for a measured second cycle counter state of the node based on information contained in the received synchronization message by a stochastic state estimator, the estimated first cycle counter state estimating the first cycle counter state of the first node for a point in time at which the synchronization message is received by the node, and the estimated compensation factor estimating a duty cycle ratio of the reference clock frequency to a respective internal clock frequency for the synchronization cycle;
(c) a linear-quadratic regulator is utilized to determine from both the estimated first cycle counter state and the estimated compensator factor a controlled first cycle counter state and a controlled compensation factor based on a controlled system which contains a correction term for the controlled compensation factor as a control variable, the controlled compensation factor estimating a duty cycle ratio of the reference clock frequency to the respective internal clock frequency, and the controlled first cycle counter state indicating a synchronized timing; and
(d) a two-dimensional model is utilized for the stochastic state estimator and the linear-quadratic regulator, the two-dimensional model comprising the estimated first cycle counter and the estimated compensation factor as states.

18. A communications network having a plurality of nodes, each of the plurality of nodes comprising a first node and at least one second node, a synchronization message being sent from the first node to the second node within a synchronization cycle, the first node providing a first cycle counter state in accordance with a reference clock frequency and the second node providing a second cycle counter state in accordance with an internal clock frequency, and a respective node of the at least one second node being configured to implement time synchronization that:
(a) the synchronization message is received at the respective second node;

(b) an estimated first cycle counter state and an estimated compensation factor are estimated for a measured second cycle counter state of the respective second node based on information contained in the received synchronization message by a stochastic state estimator, the estimated first cycle counter state estimating the first cycle counter state of the first node for a point in time at which the synchronization message is received by the respective second node, and the estimated compensation factor estimating a duty cycle ratio of the reference clock frequency to a respective internal clock frequency for the synchronization cycle;

(c) a linear-quadratic regulator is utilized to determine from both the estimated first cycle counter state and the estimated compensator factor a controlled first cycle counter state and a controlled compensation factor based on a controlled system which contains a correction term for the controlled compensation factor as a control variable, the controlled compensation factor estimating a duty cycle ratio of the reference clock frequency to the respective internal clock frequency, and the controlled first cycle counter state indicating a synchronized timing; and (d) a two-dimensional model is utilized for the stochastic state estimator and the linear-quadratic regulator, the two-dimensional model comprising the estimated first cycle counter and the estimated compensation factor as states.

19. The communications network in accordance with claim 18, wherein the communications network is configured such that in step b) a variation of the compensation factor based on a stochastic process is modeled.

* * * * *